Oct. 16, 1945.  M. L. BALZARINI  2,386,775
EDIBLE PRODUCT AND PROCESS FOR ITS PRODUCTION
Filed Aug. 3, 1940  2 Sheets-Sheet 2
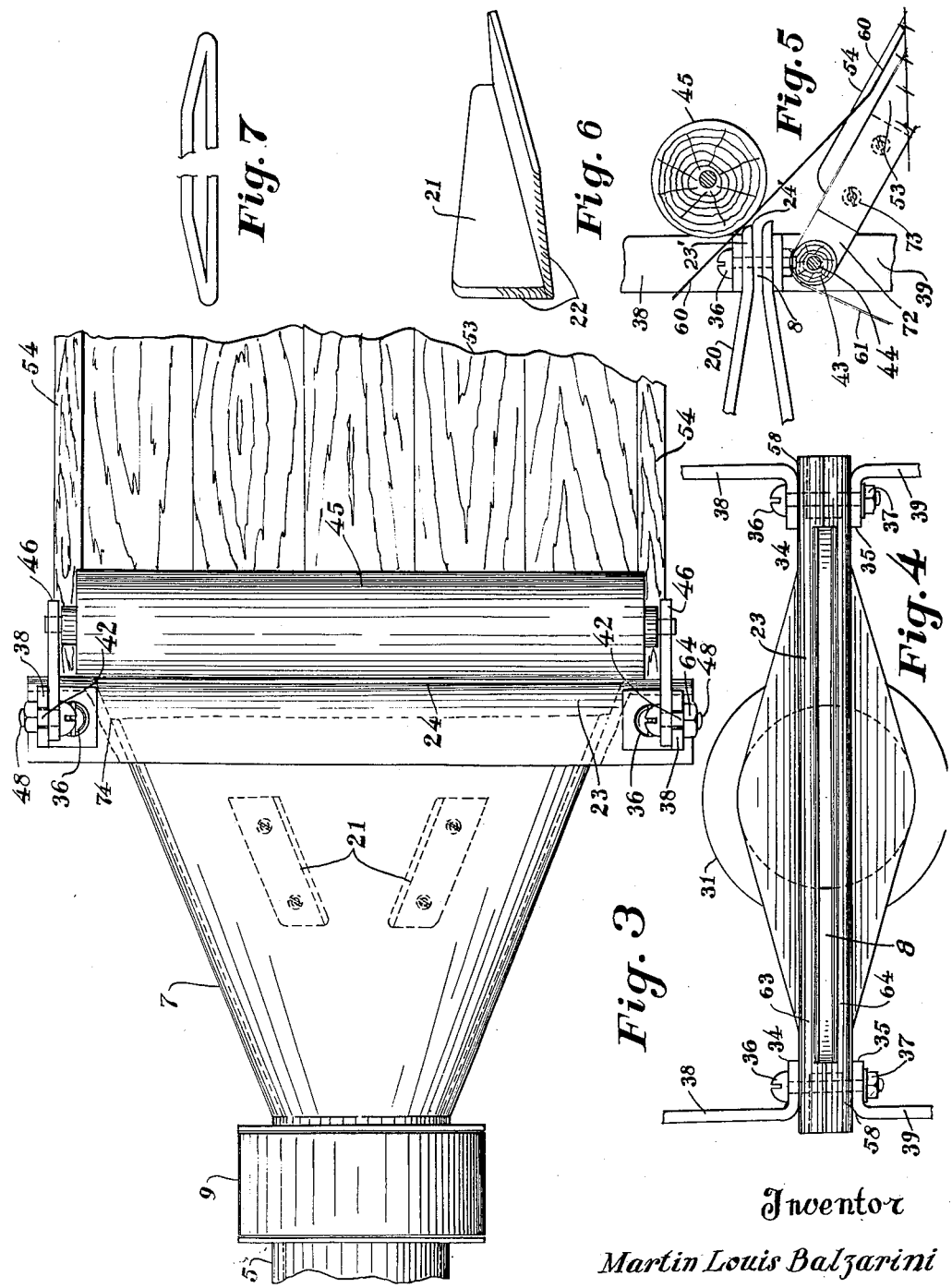
Inventor
Martin Louis Balzarini
By Bennett H. Levenson,
Attorney Patented Oct. 16, 1945

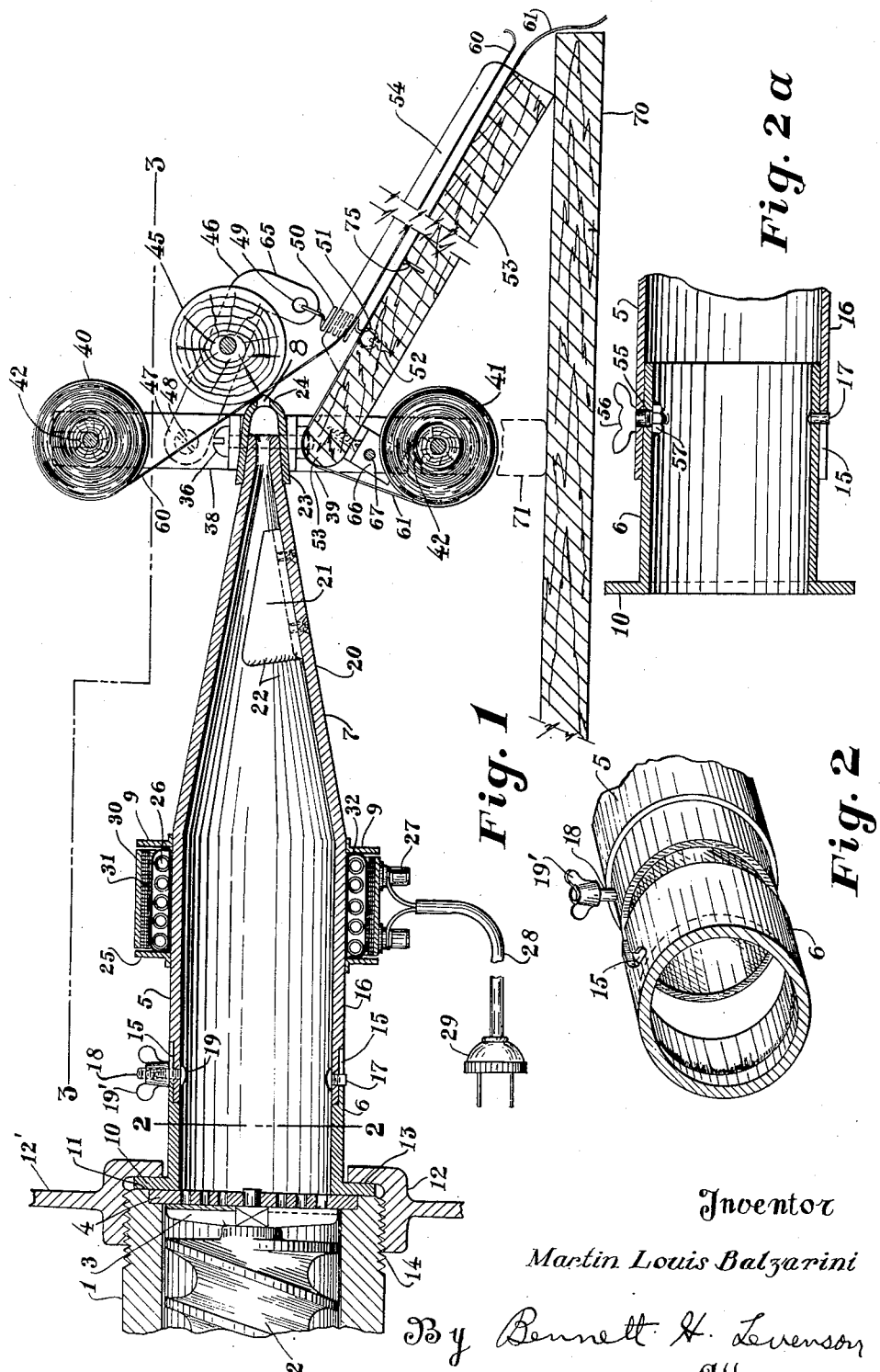

2,386,775

UNITED STATES PATENT OFFICE 2,386,775

EDIBLE PRODUCT AND PROCESS FOR ITS PRODUCTION

Martin Louis Balzarini, Rockport, Mass., assignor of one-fourth to Bennett H. Levenson, Washington, D. C.

Application August 3, 1940, Serial No. 350,324

9 Claims. (Cl. 99—108)

This invention relates to the art of preparing edibles of animal origin. More particularly it pertains to the production of meat products of a fatty nature, and embraces among its features, novelty of method and apparatus utilized in the obtention of a product innovation. While the invention is of broad application, a primary embodiment thereof involves a uniform sheet of fatty material adaptable for enveloping meats, preparatory to a roasting treatment, as well as the process and means devised for its production.

In modern market practice, the first step in the preparation of choice cuts of meat for roasting treatment involves removal therefrom of essentially all fat and gristle. The resulting trimmed meat is then enveloped either wholly or partially in a sheet or layer of fat intended to retain the meat juices and provide the essential roasting fluid. However, various difficulties have been encountered in the preparation of a requisite sheet of fatty material, and the product heretofore attainable has not been entirely satisfactory.

It is known to produce strips of fat applicable to the wrapping of beef roasts by working pieces of fat through the conveyor screw housing of a meat grinding machine, from which the cutting element and end perforated disc have been removed, into a funnel means adapted to cross the fat fibers; thence the mass is conducted to a shaping passageway. Such procedure and apparatus does not contemplate the production of a sheet of fatty material having a substantially enlarged width, as compared with the diameter of the conveyor screw housing. Moreover, the product manifests perviousness in some measure to the meat fluids and, in view of its fibrous characteristics, will result in the presence of residual fat at the end of the roasting procedure.

To obviate such undesirable residual material after roasting, it has been found effective to disintegrate or disaggregate the fibrous structure of the fatty material utilized in producing the enveloping sheet, by resort to a meat grinder machine. The manual conversion of this ground material into a sheet form, in addition to embodying tedious manipulation, results in a product devoid of uniformity and objectionably pervious to meat fluids, such as blood; such criticisms are conceded to be significant details in affecting the utility of the ultimate product.

Attempts to utilize mechanical means in the preparation of a layer of disaggregated fat by a coordination of cutting and shaping devices have proven ineffective, since they do not lend themselves to the obtention of a product of desirable dimension. For example, where a shaping attachment, adapted to provide a fat sheet of enlarged width substantially in excess of the diameter of a meat grinder, has been utilized in direct association with the outlet of said cutting or grinding device, there has been a definite tendency toward the formation of three irregularly disconnected sheets; this undesirable result may be attributable to an inherent characteristic of such an apparatus combination to exert the conveyor pressure essentially through straight lines, which results in a concentration of pressure at the central portion of the shaping device outlet, corresponding with the outlet diameter of the meat grinder.

It is an object of my invention to obviate such difficulties and uncertainties as hereinabove referred to by an improved method and apparatus for producing a novel product.

An important object is to obtain a uniform, coherent sheet of a disaggregated fatty material which is essentially impervious to meat fluids and the like.

Another object is to provide a method for producing an enlarged sheet of fatty material having the aforementioned attributes.

A further object is to devise a method for expeditiously producing an enlarged uniform, coherent sheet of fatty material having its fibrous structure essentially completely disaggregated.

An additional object of the invention is to attain an apparatus adapted to effectively prepare a sheet of meat wrapping fat of the type disclosed.

Still another object is the provision of a simple, sturdy attachment for a complete meat grinder device adapted to directly produce a sheet of fatty material of substantially enlarged width compared with the diameter of the meat grinder outlet.

Other objects, advantages, and features of my invention will become apparent from the following description to be read in connection with the accompanying drawings, in which similar elements are designated by like numerals:

Figure 1 presents a side elevational view partly in section including the combination of meat grinder, spreader and shaping attachment, and supplementary appurtenances, such as a contact roller and means for handling the sheet of fatty material issuing from the said attachment.

Figure 2 is a perspective detail of the locking association between the component parts of the spreader means, taken on line 2—2 of Figure 1.

Figure 2a indicates in sectional elevation an alternative modification of the interlocking features between the separable parts of the spreader means.

Figure 3 shows a plan view along the lines 3—3 of Figure 1, indicating among other details the relative association between the shaping nozzle of the spreader and the roller adapted to contact the formed sheet of material as it issues from the nozzle outlet.

Figure 4 is a front end view of the spreader showing the nozzle and one design of shaping orifice, together with means for mounting the appurtenances on the nozzle.

Figure 5 is drawn to an alternative modification of the spreader-nozzle structure, as well as the association of attendant supplementary parts.

Figure 6 offers a perspective indication of a preferred deflector means.

Figure 7 is a front detail showing of a modified nozzle orifice design.

Referring more particularly to the details of structure shown in the various figures of the drawings, the housing of an ordinary meat cutter or grinder is indicated by 1, with 2 designating the conventional feed screw conveyor, at the end of which is affixed in normal fashion cutting element 3 and perforated extruding plate disc 4. The spreader means attachment broadly indicated by numeral 5 embraces among it's component parts conduit portion 6, spreader means 7, shaping nozzle 23 having orifice 8, and may include as an integral element thereof heating means 9, although the latter may conveniently comprise a separable heating unit.

It will be noted that one end of the cylindrical conduit portion 6 is flanged as shown at 10 to provide a uniform contact surface 11 adapted to snugly fit against the peripheral portion of perforated extruding disc 4 as well as housing 1. Thus by the expedient of an annular ring 12 seated on the flange 10 and internally threaded to coordinate with the external threads 14 of the end portion of the meat grinder housing, conduit 6 may be rigidly attached in operative association with the meat cutter or grinder outlet. Annular ring 12 may conveniently be integral with the inner portion of a hand-tightening wheel conventionally utilized for the end closure of a meat grinder device, and of which only the web means 12' is indicated. Desirably the internal diameter of conduit 6 should be at least equal to the diametric dimension of the perforated portion of the extruding plate disc 4; as shown in Figure 1, the conduit diameter is somewhat larger to conveniently embrace the entire perforated area of disc 4.

Although attachment 5 can effectively be designed as a unitary structure embracing conduit portion 6 and spreader means 7, it has been found expedient, especially in connection with the assembly of the apparatus, to constitute these component parts as separable units. By this arrangement, the end of conduit 6 opposed to flange 10 is conveniently passed through annular ring 12 until the flange contacts with seat 13 of the ring. This assembly is then affixed to the end of the meat grinder housing, in accordance with the foregoing description.

As shown in Figures 1 and 2, the peripheral portion of conduit 6 located toward the end opposite flange 10, is cut to provide opposing bayonet slots 15. Portion 16 of spreader means 7, which is shown designed with its free end of a diameter somewhat less than that of conduit 6, is fitted with means to afford a suitable interlocking of the spreader 7 with the conduit 6. Pursuant to the drawings, 17 represents a short stud protruding from the surface of spreader portion 16, and 18 designates a surface threaded short bolt having one end thereof retained contiguous to the inner surface of portion 16 by the expedient of an enlarged head or washer element 19, with a wing nut 19' positioned at the opposing end of the bolt. Stud 17 and short bolt 18 are relatively positioned in a manner to respectively engage the aforementioned bayonet slots 15 for an interlocking association. By tightening up on the wing nut 19, conduit 6 and spreader 7 become rigidly affixed to each other and constitute a unitary attachment, of which components 6 and 7 may be separated at will.

In accordance with the modification of Figure 2a, a bayonet slot 15 is formed on the peripheral surface at the free end of portion 16 of the spreader means. The entire conduit 6, or at least the end portion thereof opposite flange 10, may be of a diameter slightly less than that near the free end of portion 16 in order to attain a snug overlapping association when the first named means is fitted into the latter. Appropriately spaced apart from the bayonet slot 15 at a substantially opposing point on the periphery of portion 16 there is provided an opening 55, desirably, although not necessarily, internally threaded through which surface threaded wing bolt 56 may be screwed into an appropriately positioned internally threaded boss 57, or equivalent means, on the internal periphery of conduit 6. A stud 17 protrudes from the outer surface of conduit 6 for coordinated association with slot 15 when conduit 6 is fitted into portion 16 in a manner to align boss 57 with opening 55. Upon threading wing bolt 56 into 55, 57 to interlock conduit 6 with the spreader means, a desirable integral attachment is attained similar to that shown in Figure 2.

A preferred embodiment of spreader element comprises the aforementioned cylindrical portion 16 adapted for a coordinated fit with conduit 6, and part 20, which in vertical elevation manifests an inward tapering toward nozzle 23 and in horizontal elevation flares outwardly, as shown in Figure 3, toward nozzle 23, whereby the material treated is spread to the desired width and thickness. Differently stated, the inward taper of the vertical plane of the spreader element determines the thickness of sheet, whereas the outward flare or taper controls the width of the sheet formed.

Angularly shaped deflectors 21 have been found effective in regulating the flow of material through the spreader portion 20 outwardly to the desired width; as shown in Figure 6, the deflector may expediently be designed to have rounded edges 22 which tend to obviate any impediment to the normal flow of material.

Where the material utilized in the fabrication of the spreader is sufficiently sturdy to withstand the reasonable pressures developed in the nozzle, a prolongation of portion 20 of the spreader means may appropriately function as nozzle 23', in accordance with the showing of Figure 5. It will be apparent that the opposing sides determining the nozzle are generally in parallel planes, although a slight convergence of the horizontal walls has been found conducive to the fat sheet formation.

A particularly effective nozzle embodiment is that designated as 23 in Figures 1, 3 and 4. This modification is fabricated independently of the spreader and desirably of material which is especially sturdy in character, and capable of withstanding any pressures developed within the nozzle as well as supporting substantial loads that may be attached thereto. Desirably, the opposing horizontal walls of nozzle 23 manifest a slight convergence, as in the case of nozzle 8. By resorting to a slight curvature 24 approaching the orifice edge, applicable to either modification of nozzle shown, the important coordinated function of roller 45 relative to the nozzle orifice is substantially facilitated. As apparent from Figures 3 and 4, the structure of nozzle 23 may be designed to extend laterally substantially beyond the edges of the orifice per se to thereby provide end portions 58 for attachment and support of the appurtenances involved in the processing of the fat sheet, as will be further described hereinbelow. Shaping nozzle 23 should preferably be affixed to spreader 7 in a permanent manner illustrated by welding or riveting.

The shape of nozzle orifice may be in accordance with any predetermined design to provide any predetermined form or shape. While in Figure 4 it is shown as substantially rectangular, various other shapes may be resorted to, dependent upon the desired form characteristics of the contemplated sheet of fatty material. Where the orifice design is such as to taper at the ends, as shown in Figure 7, the resultant fat sheet will issue with thin edges susceptible for uniform overlapping when utilized as an enveloping or wrapping means for meat or the like. It will be clear that the dimensions of the orifice will ultimately determine the significant width and thickness of the sheet product obtained.

Within the housing of heating unit 9, shown in Figure 1, are electric heating coils 26 that connect with terminals 27 to which are attached lead wires 28 having at their end a conventional plug 29. The numeral 30 designates a heat insulating cover for the coil housing and may also desirably manifest electrical insulation properties. Over coils 26 there is positioned material 31 having electrical nonconducting characteristics and preferably also function in the dual capacity of heat insulator; illustrative of this material is asbestos sheeting or filler. Beneath coils 26 and preferably surrounding them are located thin sheets of electrical insulation 32 exemplified by strips of mica, which may also be utilized to isolate the coils from the side walls of the heating unit 9.

While the heating unit positioned as shown has proven quite effective and desirable, variations relative thereto will be clear to one versed in the art; for example, operative results may be attained by associating the heating unit with portion 6 or even the spreader 7. Moreover, the heating unit may be located internally of the spreader element instead of on its outer periphery. As an alternative for an electrical heating means, hot water or the like may be conducted through appropriately positioned tubes either circumventing the spreader or internally thereof, preferably contiguous to the wall surface.

Relative to the appurtenances shown in Figures 1, 3 and 4, they may as previously indicated, be expediently mounted on the shaping nozzle. By way of illustration, and not of limitation, supporting brackets 38 and 39 are affixed to the upper and lower surfaces 63 and 64 respectively, of nozzle 23, at the end portions thereof which extend beyond the nozzle orifice per se. This is attained by the insertion of surface threaded slotted bolts 36 through openings in the angular or flanged ends 34 and 35 of said brackets as well as through corresponding openings through the ends 58 of the nozzle, and tightening up on nuts 37. The said supporting brackets are provided with openings or slots 42 for paper supplying shafts. Roll 40 desirably represents transparent cellulose paper such as Cellophane, while 41 designates a roll of wax paper.

Pressure roller 45 is rotatably supported on arms 46 which at one extremity 47 are pivotally affixed to supporting brackets 38, by slotted pivot bolt means 48 retained in situ by nuts 64. The opposing ends of arms 46 may have angular portions 65 and are attached to tension springs 50 through openings 49; the opposite extremity of said spring, which is shaped in hook form 51, engages eyelet 52 positioned on the side surfaces of meat board 53. As shown in Figure 1, pressure roller 45 actually rests on the nozzle 23 at substantially the upper edge of the orifice; it is positioned to substantially obstruct the passage of the fat sheet from the orifice, in the sense that as the sheet emerges from the orifice its upper portion contacts the roller which subjects its weight to the sheet under the influence of springs 50. By this structural arrangement the possibility of any buckling or wrinkling of the fat sheet is obviated. Desirably roller 45 manifests its effect through Cellophane 60 which it simultaneously applies.

It will be apparent from the drawings that the meat board is essentially positioned at an incline relative to the outlet of the shaping nozzle with its upper end disposed in close proximity to, but slightly lower than the nozzle orifice. The disposition of said meat board is such as to facilitate the passage of the sheet of fatty material emerging from the spreader and shaping attachment, and its surface width will necessarily be somewhat greater than the orifice width to enable the issuing product to slide thereover without obstruction. The receiving surface of meat board 53 may be highly polished and/or waxed or smoothly enameled to decrease the coefficient of friction, and is conveniently supplied with guide flanges 54.

The particular manner of supporting the meat board as well as other appurtenances are determined largely by circumstances and expediency. In the event that the spreader-nozzle attachment is sufficiently rugged to withstand the load, brackets 38 and 39 together with the paper rolls and supplementary elements including the pressure roller may be supported by the arrangement shown in Figures 1, 3 and 4, hereinabove described. The meat board 53 can be sustained by brackets 66, keyed by means 67 through coordinated openings in brackets 66 and 39, the angular portion of brackets 66 being affixed to the under surface of said meat board at the upper end thereof. The lower end of the meat board is shown in Figure 1 to be resting on a table support 70, which may be the base upon which the meat grinding machine is bolted. Should the weight of paper rolls, meat board and other mentioned supplementary elements be excessive, the load may be sustained by any expedient external means. By way of suggestion only, the dotted indication 71 provides for the utilization of bracket supports 39 of a sufficient length to contact said table support 70.

While the modification of Figure 1 discloses the upper end of the meat board 53 rounded or beveled to effectively serve as contact guide for wax paper 61 passing thereover, Figure 5 discloses the use of guide roller 43, similarly mounted on supporting brackets 39 through appropriate slots or openings for seating its shaft 44; guide roller 43 will facilitate the supply of paper from roll 41 and is especially desirable where this paper load is quite substantial. As shown in Figure 5, supporting brackets 38 and 39 may be affixed to the extremities of nozzle 23', which in this modification comprises a prolongation of spreader portion 20; however, similar to the suggestion above in connection with the nozzle of Figures 1, 3 and 4, supplementary or even independent supporting means may be resorted to in accordance with the dictates of expediency.

It will be noted that pressure roller 45 is mounted in the modification of Figure 5 proximate to curved portion 24' of nozzle 23' and partially obstructs the nozzle orifice to the extent that an emerging fat sheet will necessarily contact the lower periphery of the roller; the lower portion of the orifice is substantially free from obstruction. While this arrangement will yield satisfactory results in preventing buckling or wrinkling of the fat sheet issuing from the orifice, the modification shown in Figure 1 is deemed preferable.

The support of the upper end of meat board 53 similarly involves a variation in accordance with Figure 5. Metal plates 72 are attached to the sides of the meat board by screws or similar means 73 and are provided with openings for coinciding with the openings for shaft 44 in supporting brackets 39; thus, the journalling of shaft 44 in the said coinciding openings will serve to sustain the upper end of meat board 53. However, any other means, such as keying plate 73 independently of shaft 44, to supporting brackets 39, is susceptible of effective utilization.

It is obvious that the material of which the various parts are fabricated has no critical bearing on this invention and will doubtless be determined from expediency or preference, in view of the specific use to which the device is to be applied. Similarly the dimensional details of the apparatus are subject to wide variation dependent upon the particular circumstances and application; briefly stated, it will be necessary to predetermine the shaping nozzle orifice characteristics in order to obtain a product sheet of desired width and thickness. A tangible embodiment of the spreader attachment, providing excellent results and emphasizing the facility and simplicity of the constructive design to which the invention lends itself, involves the following details. Conduit 6 is fabricated from a sturdy grade of galvanized sheet metal and has an internal diameter of approximately 2¾ inches, with flange 10 measuring slightly less than ½ inch, measured from the internal surface of the conduit. While the length of conduit 6 is approximately 5 inches, when interlocked with the spreader in accordance with Figure 2a, the linear dimension of conduit 6 up to the line of overlapping with portion 16 of spreader attachment 5 is essentially 1½ inches. Spreader 7 of attachment 5 is similarly formed from galvanized sheet metal and portion 16 thereof extending essentially to heating unit 9 is approximately 1½ inches in length with an internal diameter of a little over 2¾ inches, exceeding that of conduit 6 by the gauge or thickness of the galvanized metal stock utilized. The linear expanse of portion 16 to which the electrical heating coils are applied is approximately 2⅝ inches, so that the overall length of portion 16 is in the vicinity of 4⅛ inches. It may be noted in this connection that the heating surface expanse is most simply defined by flanges or annular rings 25 soldered, brazed or welded to the surface of portion 16 and spaced apart a predetermined distance—as illustrated by the above indicated 2⅝ inches.

The diverging dimension of spreader 7 from portion 16 to nozzle 23 is approximately 6½ inches; differently stated, this constitutes the linear dimension taken in the horizontal plane as shown in Figure 3 between the shaping nozzle element and the heating unit 9, which is superimposed on the surface of portion 16, according to the modification of Figures 1 and 3. Actually this horizontal plane diverging dimension is in excess of the figure specified in view of the fact that spreader 7 extends into the shaping nozzle for at least ½ inch. The union between spreader 7 and shaping nozzle 23 is rigidly affected by resort to brazing, welding or similar expedients, care being taken to provide side walls in the shaping nozzle which are essentially in extension of the horizontal plane walls of the spreader. This built up wall extension is indicated by dotted lines 74, Figure 3. The length of spreader 7 along the line of union with shaping nozzle 23 is approximately 7¾ inches.

In the illustrative embodiment being described, the shaping nozzle may conveniently be made from steel sheeting or analogous material having the dimensions of 11 inches long, 3 inches wide, and approximately ⅛ inch in thickness. It involves cutting out the appropriate nozzle orifice, which in this example is 9¼ inches in length and approximately ¼ inch in thickness; the orifice is located along the longitudinal median line of the stock sheet and spaced from the edges substantially centrally. In its ultimate form, the shaping nozzle is bent on its longitudinal median line so that the longitudinal edges of the sheet overlie each other and are spaced apart approximately ¾ inch. While the nozzle is essentially of V-shape, tapering toward the orifice, the orifice end is actually rounded, suggestive of a U.

It will be seen from this mode of structure that ends 58 of the nozzle are approximately ⅞ inch in length. Between the respective ends of the nozzle and built up wall portions 74, a gap or space exists through which slotted surface threaded bolts may be positioned for retaining supporting brackets, 38, 39 in position. These brackets may be 2½ inches in length, with an angular portion of approximately 1 inch, and the overall width of bracket essentially ⅝ inch. Arms 46 of the pressure roller are conveniently dimensioned at 3 inches in length with an angular portion of approximately 1 inch, and a width of essentially ½ inch. Pressure roller 45 has functioned quite effectively when of hard wood, approximately 2 inches in diameter, approximately 9¾ inches in length, although including journal spacers it is essentially 11 inches between supports, and having a weight of substantially ¾ pound.

For this type of mounting, the shafts of paper rolls effectively utilized were substantially 1 inch in diameter and between 10¼ and 10¾ inches. A suitable width of the paper comprising the respective paper rolls was approximately 9¾ inches. It will be obvious, however, that these dimensions are susceptible to variation, as are the various other details hereinabove described.

An exemplary indication of effective design details relative to the heating element is as follows. Two complete flat iron heating elements of nichrome, 20 gauge wire, connected in series resulted in a resistance of approximately 40 ohms. Operating at 110 volts A. C., this heating unit is rated in the neighborhood of 350 watts.

Relative to the positioning of the meat board 53, in the embodiment specified, a vertical line distance of approximately ¾ inch between the bottom edge of the orifice and the surface of the board has functioned quite satisfactorily.

By way of reiteration, and emphasis, the detailed description of an apparatus embodiment of the invention has been presented merely by way of illustration, and under no circumstances can it be legitimately construed as in any sense limitative.

To facilitate the consideration of the broad aspects of the process and the operation of the preferred embodiment of apparatus disclosed, these two phases of the invention will be simultaneously discussed. The fatty material, illustrated by cod or beef fat, is supplied to the meat grinder or cutter 1 wherein it is conveyed by screw means 2 to the cutter element 3 and through perforated extruding disc 4 from which it issues in the well known form of strands. In practical application, to avoid undue strain on the grinder device, it is advisable first to pass the fat through a meat grinder device, provided with an extruding disc having substantial sized openings—for example, ⅜ inch—and before the inventive attachment disclosed herein is connected to said grinder. Subsequently thereto, a disc having smaller perforations, exemplified by ⅛ inch, is substituted for the first used extruding disc, the spreader attachment is affixed to the end of the aforesaid meat grinder as previously described, and the previously ground fat may then be passed through the apparatus combination without difficulty. Alternatively the fat may be passed through two meat grinders arranged in series, the first having the larger size disc perforations and the second the predetermined smaller size.

The resultant disaggregated fatty material passes from the extruding disc into the spreader attachment 5, moving therethrough in contact with the surface heated by heating element 9, thence through the spreader 7 and out through the shaping nozzle 8. Immediately upon emerging from the shaping nozzle, the sheet contacts pressure roller 45 positioned in direct proximity with the nozzle orifice and in a manner to partially obstruct or substantially completely obstruct the free horizontal passage of the material. The curved nozzle outlet shown in Figure 1, as previously indicated, is particularly effective in facilitating the position of the pressure roller relative to the nozzle orifice. Desirably roller 45 contacts the emerging sheet of fat through a transparent cellulosic material, exemplified by Cellophane, thereby simultaneously applying a paper sheet cover to the upper surface of the fatty material. Wax paper 61 unwound from its roll 41, covers the surface of meat board 53; as the fat sheet passes onto the said meat board, it is accordingly furnished with a wax paper undercover. Due to the inherent adhesive characteristics manifested by the fat sheet resulting from the inventive process, the wax paper and Cellophane cohere sufficiently to the fat sheet to freely unwind their respective rolls as the product moves along the meat board 53. If desired, however, supplementary pressure rolls may be applied to the paper covered product on the meat board if any uncertainty in the unwinding of the paper rolls is encountered, although this is deemed quite unnecessary under normal conditions. As the fat sheet slides off the meat board, it is cut to any predetermined length by expedient conventional means; thus, by cutting at notch 75 when the emerging end of the fat sheet reaches the table end of board 53, a predetermined length of sheet is obtained with facility.

A particularly significant feature of the invention resides in the application of heat to the fatty material passing through the spreader attachment. It has been found that the application of sufficient heating to the disaggregated mass of fatty material to melt a minor proportion thereof, will result in substantially increasing the coherency of the mass and provide lubrication to facilitate the passage of the disaggregated fatty mass through the spreader and shaping nozzle. By this important expedient, the tendency of a sheet, having a width in excess of the diameter of meat grinder housing and extruding disc, to rupture irregularly into three disconnected sheets is obviated. Differently stated, the melting, i. e. softening or plasticizing of a minor proportion of fatty material enables the production of a sheet manifesting desirable uniformity characteristics not heretofore attainable. Moreover, and of material importance is the fact that the molten proportion serves to render the ultimate fat sheet essentially impervious to meat fluids and the like.

For the efficient performance of the process, it is clearly desirable to avoid excessive melting, or of a preponderance of molten or softened disaggregated material passing through the spreader-nozzle attachment. The presence of an unduly large amount of molten fat will, in the absence of special precautions, result in the loss of material, render handling generally difficult, and may even thwart the efficient production of a uniform sheet of fatty material manifesting sufficient flexibility to render it utilizable for enveloping meat roasts. In this connection it is within the contemplation of the invention to provide any desirable cooling subsequent to the heating treatment, if for any reason the heating treatment is carried to the point of attaining a substantial proportion of molten material; by this cooling expedient, it will be apparent that a control is available to obviate the presence of excessive oils at the point where the fatty material is shaped and emerges from the nozzle. An optimum range of melting is estimated to be between approximately 5% and 25% of the mass of fatty material passing through the spreader attachment. A particularly effective value indicative of the molten fat proportion is considered to be approximately 10–15%.

It should, however, be borne in mind that the extent of melting is susceptible to a substantial latitude of variation, since it is affected by a wide diversity of conditions similar to those specified hereinbelow in the discussion of optimum temperature conditions. Moreover, the actual molten content does not lend itself to a simple determination, since the optimum conditions of performing the process do not contemplate loss of fat by the draining and flowing away of the melted portion; by contradistinction, the proportion of fat which is fluidized is essentially adsorbed or retained by the remainder of the mass. In general, the performance of the process involves the melting of a minor proportion of disaggregated fat. Within the contemplation of this terminology the proportion may approach as much as approximately 50% of the total mass. While such a high molten percentage may be excessive for practical operation, without special precautions such as cooling, it is operatively within the scope of the disclosure. By resort to such special precautions, this proportion may be materially exceeded even to the point of substantially complete melting; however, the sheets resulting from too great an excess of melting may for normal roasting usage be less satisfactory due to a tendency to fluidize too rapidly and to a progressive diminution of sheet flexibility with increase in molten proportion of the sheet.

While, in accordance with the apparatus utilized, it is especially advantageous to attain the melting of fatty material circumferentially of the disaggregated mass passing through the attachment, it is not intended to be restricted to this modification.

It will be apparent that, even though the heat be supplied internally of the mass of fatty material, as it moves through the spreader, the fluid content will desirably be distributed therethrough forming a uniform sheath of molten fatty material at the surface of the mass which solidifies as a smooth, fluid-impervious coating. However, the circumferential heating has functioned quite satisfactorily; and it is of interest to note that a sample withdrawn from the heating zone, without forcing it through the spreader, reveals an annular ring of fatty material showing definite evidence of some melting manifested by visible surface melting and by general softening, whereas the internal body of the mass has been substantially unaffected by the heat trentment. Thus the ultimate product or article may comprise a compact core or body portion of ground or disaggregated fatty material in a heterogeneous state, with a smooth, uniform, fluid-impervious coating or sheath of fatty material enveloping the said core or body portion.

In this way, the predetermined proportion and type of fatty material in the desired state of plasticity or fluidity is present in the mass to be extruded in sheet form and distributed therethrough.

Thus a predetermined quantity of fatty material may be rendered molten or plastic in the desired degree by heating, by pressure at appropriate temperature or by addition of soft fatty material, and blended with the mass of material to be extruded in sheet form by appropriately supplying the same during the course of passage of the mass of material through the conveyor, and desirably at a point proximate and just prior to the spreading zone. Moreover, the initial temperature of the stock, as a result of atmospheric conditions or otherwise, in its blended or disaggregated state may be such as to provide the desired degree of coherence or lubricating value in the mass where extruded.

The temperature to which the fatty material is subjected in its passage through the spreader attachment will inevitably be affected by a wide diversity of variable conditions. Among these are noted the melting temperature of the particular fat or blend thereof used in the process; the percent of molten material contemplated; the rate of passage of said fatty material over the heating surface; the distance of the heating surface from the shaping nozzle orifice; the heating surface area; the temperature of the fatty material when brought into contact with the heating means; the heat design characteristics of the spreader-nozzle attachment; etc., etc. It is accordingly apparent that no fixed temperature value can be generally applicable.

The broad adaptability of the invention renders possible substantial variation as to details of process and apparatus without altering the features thereof. The following is presented merely by way of illustration, utilizing the above described embodiment of spreader attachment and heating unit and an electrically operated meat cutter device utilizing a 3 inch extruding disc plate. Having passed substantial quantities of beef fat, including fat trimmings, through the coarse extruding disc, the attachment was affixed to the end of the meat grinder, with the extruding disc having the essentially ⅛ inch openings in position. Closing the heating element circuit, an elapse of 4 to 5 minutes was permitted in order to attain a preliminary temperature rise at the heating zone prior to passage of disaggregated fat therethrough. Trial tests have indicated that for the above described device, this time interval, in the absence of any cool fat passing through, will provide a temperature of between approximately 150° F. and 190° F. Longer intervals, such as 6 to 7 minutes will provide starting temperatures of between approximately 200° F. and 230° F. which is not considered necessary.

Having attained the desired preliminary heating, the disaggregated fat, having a temperature of approximately 40° F. to 45° F., was passed through the spreader attachment to form a continuous length of fat sheet of substantially 9¼ inches width and ¼ inch thickness. Sheets of 24 inch length were cut by passing a knife edge into slot 75 when the emerging end of the product reached the table end of the meat board 53. While the specified fat sheet dimensions have been ascertained as desirable for all normal demands, there is no intent to be restricted to any specific dimension of sheet product. The rate at which the disaggregated fat was passed through the device varied with the extent of manual tamping of the material at the supply end of the meat grinder device. With average tamping, finished sheets of 24 inch length were obtained in between 17 and 23 seconds, weighing approximately 2¼ lbs.

In the illustrative procedure given above, the temperature of the sheet issuing from the nozzle was not materially in excess of the temperature of the disaggregated starting material supplied to the spreader means. The increase in temperature is, however, subject to variation dependent upon the initial temperature of the fatty material, the extent of melting to which the disaggregated fatty material is subjected, the time interval of heating, the temperature of the atmosphere, as well as many other collateral effects obvious to one skilled in the art.

While the temperature in the heating zone will rise above that at the commencement of the process, there is no tendency toward excessive melting, as long as the cold disaggregated fat is being fed through the device. Accordingly, when terminating the procedure for any reason, the heat circuit should be opened to avoid undue fluidization of the fatty material located in the heating zone.

A simple alternative method of procedure is to expose the ground fat or similar material to such heating conditions as will assure melting a substantial portion thereof, and maintaining a material section of the orifice end of the shaping nozzle at a temperature well below the solidification point of said fatty material. This essential cooling is obtainable by resorting to any appropriate refrigerating or cooling jacket or encasement means applied to an appropriate peripheral area of said nozzle. Where the complete apparatus combination shown in the drawings is mounted within a refrigerator maintained at a sufficiently low temperature, the supplementary cooling means will in accordance with the circumstances, be dispensed with. However, resort to this cooling expedient is desirable only where an excessive proportion of fat is melted; under optimum conditions of operation such cooling is definitely unnecessary.

From a general standpoint, the heating details will be determined with facility by any skilled person to satisfy the prevailing procedural circumstances, and for a given apparatus set-up.

By virtue of the method and apparatus hereinbefore described, the disaggregated fatty material is converted into a uniform, homogeneous product of predetermined width and thickness. It is essentially devoid of fibrous structure, substantially fluid impervious, and susceptible to complete dissolution pursuant to normal roasting treatment of the meat which it envelops. As the sheet of fatty material issues from the apparatus, it is preferably encased by transparent cellulosic paper, as Cellophane, on one surface thereof and wax paper on the other. Noteworthy is the fact that a meat roast may be enveloped by a sheet of disaggregated fatty material, covered with Cellophane and produced as herein, several days in advance of contemplated sale without evidences of a murky brown coloration on the inner surface of the Cellophane which is attributable to meat fluids seeping through a pervious fat sheet. This is a matter of material significance in view of the conceded effect of appearance on salability of the roast.

While the preferred embodiment of the invention is directed to the treatment of disaggregated fatty material to form a sheet which constitutes a material improvement over prior art products, distinct advantages are attainable in the treatment of fatty material, in accordance with the present disclosure, which has not been disaggregated as described herein. Thus by subjecting to a heat treatment pursuant to the present method a natural fatty material aggregate per se, or one which has been treated to rupture its structure, but is not ground or disaggregated as by passing the fatty material through a meat grinder provided with its normal cutting and extruding means, the formation of molten material during the passage of the fat through the spreader attachment will likewise function to improve the cohering characteristics of the material, lubricate its movement through the apparatus, and render the sheet formed essentially fluid impervious.

The expression "fatty material" as utilized in the present application is intended to embrace any substance which is adapted to envelop meat and function to facilitate the roasting thereof. It particularly includes the well-known fats of animal origin illustrated by tallow, cod fat, suet as well as blends or admixtures of such fatty materials. It is not essential that the material be exclusively of a fatty nature to fall within the scope of the expression. It is within the contemplation of the indicated terminology to include any suitable material which is preponderantly of a fatty nature; thus a sheet may, for example, contain a substantial proportion of ground meat, provided fatty material is present in preponderant quantity.

By way of further modification within the contemplation of the disclosure, the procedure described herein lends itself to the preparation of meat products embracing a substantial proportion of fat at least in sufficient quantity to enable the formation of a fluid impervious coating.

Thus a blended meat product may be obtained by disaggregating a mixture of meat and fatty material, the proportion of the latter being at least sufficient to provide a fluid impervious coating for the meat. Desirably the quantity of fatty material in the blended mixture should be sufficient for any subsequent cooking treatment contemplated. The disaggregated mixture is subjected to heating, as hereinabove described, in order to melt a sufficient quantity of the fatty material to afford on cooling a protective and fluid impervious function. Subsequently to the heat treatment, the mixture will preferably be manipulated in any predetermined manner, either as herein described or according to prior art practices for converting the same to any desirable shape or form. In this manner, meat shapes or patties can be prepared which are susceptible to retention for substantial intervals of time without the usual spoilage, tainting or discoloration occurring as a result of normal exposure to the atmosphere.

In accordance with the foregoing description, it is apparent that the apparatus embodies an expeditious means which may be effectively utilized in the performance of a novel method to attain a new product.

While I have described my invention in accordance with preferred embodiments, it is obvious that many changes and modifications may be made in the details of construction and procedure, as well as in the combination and arrangement of parts or steps without departing from the spirit of invention as defined in the following claims.

Having thus set forth my invention, I claim:

1. A fatty article of predetermined form comprising in major proportion a compact body portion of disaggregated fatty material, and in minor proportion a substantially uniform fluid-impervious sheath of fatty material enveloping said body portion.

2. A compact sheet of fatty material comprising in major proportion a heterogeneous core of disaggregated animal fat, and in minor proportion a substantially uniform homogeneous, fluid-impervious sheath of animal fat enveloping said core.

3. A sheet of fatty material comprising in major proportion a compact heterogeneous core of disaggregated animal fat, and in minor proportion a substantially uniform homogeneous, fluid-impervious sheath of animal fat, which has been molten and solidified, enveloping said core.

4. The method of producing a substantially uniform, fluid-impervious sheet of animal tallow which comprises disaggregating tallow, heating the surface of said disaggregated mass to a temperature sufficient to melt a minor portion thereof, spreading and compacting the mass, and conveying said mass through a sheet-forming zone.

5. The method of treating animal fat which comprises disaggregating the animal fat, melting a proportion of the resultant mass in quantity sufficient to provide a fluid-impervious homogeneous sheath upon cooling, spreading and compacting said mass, into the form of a uniform sheet, and cooling the sheet.

6. The method of producing an enlarged uniform, fluid impervious sheet of fatty material which comprises grinding said material, melting a minor proportion thereof along its peripheral surface to lubricate its passage and increase the cohesiveness of the mass, spreading and compacting the mass during its passage through a spreading and compacting zone and then through a sheet forming zone.

7. The method of producing a uniform, fluid impervious sheet of fatty material which comprises disaggregating said material, melting a minor proportion of said disaggregated mass spreading and compacting the same during its passage through a spreading and compacting zone, thereby lubricating the passage of the material and increasing its cohesive characteristics, forming the resultant mass into a sheet, and then simultaneously applying to the sheet of fatty material a transparent cellulosic paper cover from a roll thereof to the upper surface and a wax paper cover from a roll thereof to the under surface, the inherent adhesive characteristics of the fatty material facilitating the unwinding of the paper from their respective rolls.

8. The method of producing blended meat products which comprises disaggregating a mixture of meat and a substantial quantity of fatty material, melting a sufficient portion of said fatty material along the peripheral surface of said disaggregated mixture of meat and fatty material to provide a fluid impervious coating, and compacting and shaping the mixture to the desired form.

9. The method of producing a uniform sheet of fatty material which comprises grinding cool fatty material, passing said ground material through a conduit having a heating surface temperature within the approximate range of 150 degrees F. to 230 degrees F. to melt a minor portion of said fatty material, spreading the heated mass and compacting the same by passage through a spreading and compacting zone, and forming the mass into a sheet by passage through a sheet forming zone, whereby a compact fluid impervious sheet is obtained.

MARTIN LOUIS BALZARINI.